United States Patent Office 3,060,102
Patented Oct. 23, 1962

3,060,102
METHOD OF PURIFYING STREPTOKINASE
Heron O. Singher, Plainfield, and Richard Egan, Neshanic, N.J., assignors to Ortho Pharmaceutical Corporation, a corporation of New Jersey
No Drawing. Filed June 8, 1960, Ser. No. 34,616
4 Claims. (Cl. 195—66)

This invention relates to a process for the purification of streptokinase, and more specifically, a process for the removal of pyrogens from streptokinase.

Streptokinase is produced by a fermentation process involving the growth of microorganisms known to be capable of eliciting the formation of streptokinase. The betahemolytic streptococci Lancefield Group A, "human" C, and G strains, are particularly prolific producers. At the conclusion of the fermentation process, the cells of these microorganisms are separated from the broth by filtration in a manner as to avoid loss and destruction of the enzymes. Present in the broth containing streptokinase are other metabolic products of bacteria which, on intravenous injection, cause a rise of the patient's temperature. These pyrogens that are normally associated with streptokinase limit its therapeutic use.

One use of streptokinase is in the activation of profibrinolysin to form fibrinolysin and activator substances that are effective in the lysing of blood clots. Since fibrinolysin and activator substances are administered intravenously, it is important that the streptokinase be as free as possible of pyrogens. Any pyrogens that are present in streptokinase will be carried through to the end product, fibrinolysin and activator substances, and cause undesirable side reactions when this material is injected.

Many processes are known for the removal of pyrogens from biologically active preparations, but because the pyrogens are difficult to remove selectively, the losses of active substance are considerable.

According to the present invention, pyrogens are removed from streptokinase by forming a soluble complex with sodium tetra-meta-phosphate that is stable and soluble at pH 5.0. The pyrogens and other impurities normally associated with streptokinase do not form a complex with sodium tetra-meta-phosphate at pH 5.0 and, therefore, under the proper conditions of concentration and temperature, may be removed from solution. The purified streptokinase may then be removed from solution by adjusting the pH to 4.2.

The peculiar characteristic of streptokinase to form a stable water-soluble complex with sodium tetra-meta-phosphate at pH 5.0 permits the separation from all other contaminants that are water-insoluble at this pH. Sodium tetra-meta-phosphate $(NaPO_3)_4 \cdot 4H_2O$, sold by the Victor Chemical Company under the trademark Cyclophos, and having a molecular weight of 472, is found to be entirely satisfactory for the process of the present invention. Moreover, since the complex of phosphate-streptokinase can be decomposed at pH 4.2 without deactivating the streptokinase, the process of the present invention becomes highly selective.

The usually available acids may be used for adjusting the hydrogen ion concentration, such as, for example, hydrochloric, sulfuric, phosphoric or acetic.

The precise quantity of sodium tetra-meta-phosphate to be used in the present process is not critical and may vary within wide limits depending upon the nature of the streptokinase itself, the amount of streptokinase and the volume of water. In general, however, it may be stated that sufficient sodium tetra-meta-phosphate should be added to form a complex with substantially all of the streptokinase that is present. The weight ratio of solid sodium tetra-meta-phosphate to streptokinase is about 1:2.

The precise quantity of streptokinase to be used in the present process is not critical and may also vary within wide limits depending upon the purity and nature of the streptokinase and upon the desires of the individual operator. In general, however, it may be stated that a solution containing about 1% to about 5% of streptokinase by weight is adequate for proper handling. Although higher quantities of streptokinase may be present, they are not desirable since the smaller relative volume of water will make the separation of precipitated impurities more difficult to handle.

Inasmuch as impurities normally associated with streptokinase tend to remain in solution above pH 5.0, this pH is quite critical. If the pH is much below 5.0, there will be some precipitation of streptokinase resulting in a low yield of the purified product. After the material that has been precipitated at pH 5.0 is removed, very little additional precipitate is formed until the pH is reduced to 4.2, at which point the purified streptokinase is precipitated completely.

The purified streptokinase recovered at pH 4.2 may be solubilized in pyrogen-free distilled water at pH 7.5 and lyophilized. Streptokinase purified by the method of the present invention is substantially free of pyrogens and has an activity of 50–60 Christensen units per gamma of nitrogen when assayed by the method described by L. R. Christensen in the Journal of Clinical Investigation, volume 28, 163 (1949).

Crude streptokinase may contain impurities which interfere with the separation of pyrogens. In fact, such impurities can substantially hinder the desired separation. Thus, partially degraded proteins and other metabolic products may impede the effectiveness of the separation process described above. The separation of a highly purified streptokinase from pyrogens in good yield may be more successfully achieved if the crude streptokinase is first subjected to a preliminary treatment. Fractionation from aqueous methanol solutions and extraction with diethyl ether will remove impurities that would otherwise interfere with or reduce the effectiveness of the process of the present invention.

The invention will be described in greater detail in conjunction with the following specific examples in which all parts are by weight unless otherwise indicated.

*Example I*

Crude streptokinase having an activity of 4–7 Christensen units per gamma of nitrogen is dissolved in 0.43% pyrogen-free aqueous sodium chloride. The pH of this solution is adjusted to 5.0±0.05 with 1 N HCl and the temperature is lowered to 0.5° C. Methanol, cooled to −20° C., is added to the solution until the concentration of methanol is 15% by volume. The resulting mixture is then stirred for 30 minutes at −5° C., ±0.5° C., and allowed to stand at this temperature for 45 minutes. The mixture is then centrifuged in a Sharples supercentrifuge at a rate of 700 milliliters per minute while maintaining the temperature at −5° C. The recovered precipitate is washed with 0.43% pyrogen-free aqueous sodium chloride methanol solution (15% methanol by volume) at −5° C. The precipitate is then centrifuged at 2000 r.p.m., resuspended in 5° C., pyrogen-free distilled water and adjusted to pH 7.3 with 0.1 N NaOH. This material is shell frozen and lyophilized. The lyophilized product is pyrogenic and has an activity of 10–12 Christensen units per gamma of nitrogen.

The lyophilized product is suspended in diethyl ether at −40° C., in a ratio of 133 parts of the lyophilized product to 45,400 parts of diethyl ether. This mixture is stirred for 1 hour at −40° C., and filtered through a Whatman #2 paper. The filtrate is discarded. The precipitate is resuspended in cold pyrogen-free distilled water, at 5° C., and the pH of the mixture is adjusted to 7.5. This material is stirred for one hour at 5° C., and centrifuged. The precipitate is discarded. The supernatant is shell frozen and lyophilized to recover the streptokinase. At this point, in the purification process, the streptokinase is still pyrogenic and has an activity of 20–30 Christensen units per gamma of nitrogen.

*Example II*

Two parts of the ether-extracted streptokinase prepared as described in Example I above is suspended in 100 parts of pyrogen-free distilled water, cooled to 5° C. One part of solid sodium tetra-meta-phosphate $$(NaPO_3)_4 \cdot 4H_2O$$

having a molecular weight of about 472 is then added. The pH of this mixture is lowered to $5.0 \pm 0.05$ with 0.1 M acetic acid and stirred for 15 minutes at 5° C. The solution so obtained is then centrifuged at 1000–1200 G for 30 minutes. During the centrifuging step, the temperature is maintained at 5° C.

To the supernatant liquid from the centrifuging step is added dropwise 1 M acetic acid until the pH is 4.2 and the mixture is stirred for 15 minutes at 5° C. This material is then centrifuged at 1000–1200 G for 30 minutes at 5° C. The precipitate so obtained is resuspended in pyrogen-free distilled water, cooled to 5° C., and the pH is adjusted to 7.5. This material is then lyophilized. The lyophilized product is streptokinase having an activity of 40–60 Christensen fibrinolytic units per gamma of nitrogen. The pyrogenicity of the streptokinase so obtained was determined by injecting rabbits intravenously with 50,000 fibrinolytic units of streptokinase per kilogram. The average rise in temperature amounted to less than 0.2° C.

What is claimed is:

1. A method of purifying streptokinase which comprises suspending streptokinase in pyrogen free distilled water, adding a quantity of sodium tetra-meta-phosphate sufficient to form a complex with substantially all the streptokinase, adjusting the pH of the solution so obtained to 5.0 thereby precipitating from solution impurities associated with the streptokinase, removing from the solution any precipitate that is formed, adjusting the pH of said solution to 4.2 and recovering from solution the purified streptokinase that is precipitated at pH 4.2.

2. The method of purifying and depyrogenating streptokinase which comprises suspending in 100 parts of pyrogen-free distilled water at a pH of about 6 to about 7 and a temperature of about 5° C., about 2 parts of the streptokinase to be purified, adding about 1 part of sodium tetra-meta-phosphate to obtain solution of the streptokinase, adjusting the pH of the solution to $5.0 \pm 0.05$, thereby precipitating from solution impurities associated with the streptokinase, removing from the solution the precipitated impurities, adjusting the solution of pyrogen-free streptokinase so obtained to pH 4.2, thereby precipitating pyrogen-free streptokinase and recovering the pyrogen-free streptokinase from solution.

3. The method of purifying and depyrogenating streptokinase which comprises suspending in 100 parts of pyrogen-free distilled water at a pH of about 6 to about 7 and a temperature of about 5° C., about 2 parts of the streptokinase to be purified, adding to the suspension about 1 part of sodium tetra-meta-phosphate to dissolve the streptokinase, adjusting the pH of the solution of streptokinase so obtained to $5.0 \pm 0.05$ with 0.1 M acetic acid and stirring for about 15 minutes at 5° C., thereby precipitating from solution impurities associated with the streptokinase, centrifuging at about 1000–1200 G for 30 minutes while maintaining the temperature at 5° C., to remove from the solution the precipitated impurities, adjusting the supernatant to a pH of 4.2 with 1 M acetic acid, thereby precipitating pyrogen-free streptokinase, and centrifuging this material at 1000–1200 G for 30 minutes at 5° C., thereby separating the streptokinase from solution.

4. The method according to claim 3 in which the pyrogen-free streptokinase is suspended in pyrogen-free distilled water, the pH is adjusted to 7.5 and the material is lyophilized.

References Cited in the file of this patent

UNITED STATES PATENTS 2,726,235     Rane et al. _____ Dec. 6, 1955

OTHER REFERENCES

Fletcher et al.: Proc. Soc. Exp. Med. and Biol., 1957, pp. 233–236.